United States Patent
Hojabr et al.

(10) Patent No.: US 6,855,432 B1
(45) Date of Patent: Feb. 15, 2005

(54) LOW ACTIVATION TEMPERATURE ADHESIVE COMPOSITION WITH HIGH PEEL STRENGTH AND COHESIVE FAILURE

(75) Inventors: Sassan Hojabr, Kingston (CA); Stephen Robert Tanny, Newark, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/070,395

(22) PCT Filed: Sep. 1, 2000

(86) PCT No.: PCT/CA00/01017

§ 371 (c)(1),
(2), (4) Date: Oct. 23, 2002

(87) PCT Pub. No.: WO01/18141

PCT Pub. Date: Mar. 15, 2001

Related U.S. Application Data

(60) Provisional application No. 60/152,539, filed on Sep. 3, 1999.

(51) Int. Cl.$^7$ .................. C09J 123/08; C09J 123/16; B32B 27/08
(52) U.S. Cl. .................. 428/461; 428/462; 525/70; 525/78
(58) Field of Search .................. 428/461, 462; 525/63, 64, 69, 70, 78, 86

(56) References Cited

U.S. PATENT DOCUMENTS

| | | | | |
|---|---|---|---|---|
| 4,861,677 A | * | 8/1989 | Lee | 428/516 |
| 5,250,349 A | * | 10/1993 | Nakagawa et al. | 428/212 |
| 5,367,022 A | * | 11/1994 | Kiang et al. | 525/74 |
| 5,597,865 A | * | 1/1997 | Jackson | 525/71 |

FOREIGN PATENT DOCUMENTS

| | | |
|---|---|---|
| EP | 0188901 A2 | 7/1986 |
| EP | 0412503 A3 | 2/1991 |
| EP | 0412503 A2 | 2/1991 |
| EP | 0712915 A1 | 5/1996 |
| EP | 0879862 A1 | 11/1998 |
| GB | 2107325 A | 4/1983 |
| JP | 59083651 A | 5/1984 |
| JP | 61014272 A | 1/1986 |
| JP | 61296044 A | 12/1986 |

\* cited by examiner

*Primary Examiner*—Susan Berman

(57) ABSTRACT

The present invention provides a resin composition made from admixing starting materials comprising: (a) 0 to 90 parts by weight of a polyolefin; (b) 5 to 95 parts by weight of a functional polyolefin; (c) 5 to 40 parts by weight of a polystyrenic; and (d) 0 to 30 parts by weight of an elastomer, where the total amount of components of (a), (b), (c) and (d) in the resin composition is 100 parts by weight. In a further embodiment, component (a) is a non-olefin copolymer and component (c) is high impact polystyrene. The resin compositions are useful as adhesives for metal and polyolefin substrates.

12 Claims, 1 Drawing Sheet

Figure 1a – Components of 5-layer Aluminum Panel Structure

Aluminum
Adhesive
Polyethylene
Adhesive
Aluminum

Figure 1b – Assembled Structure

Apply Heat & Pressure

Composite Structure

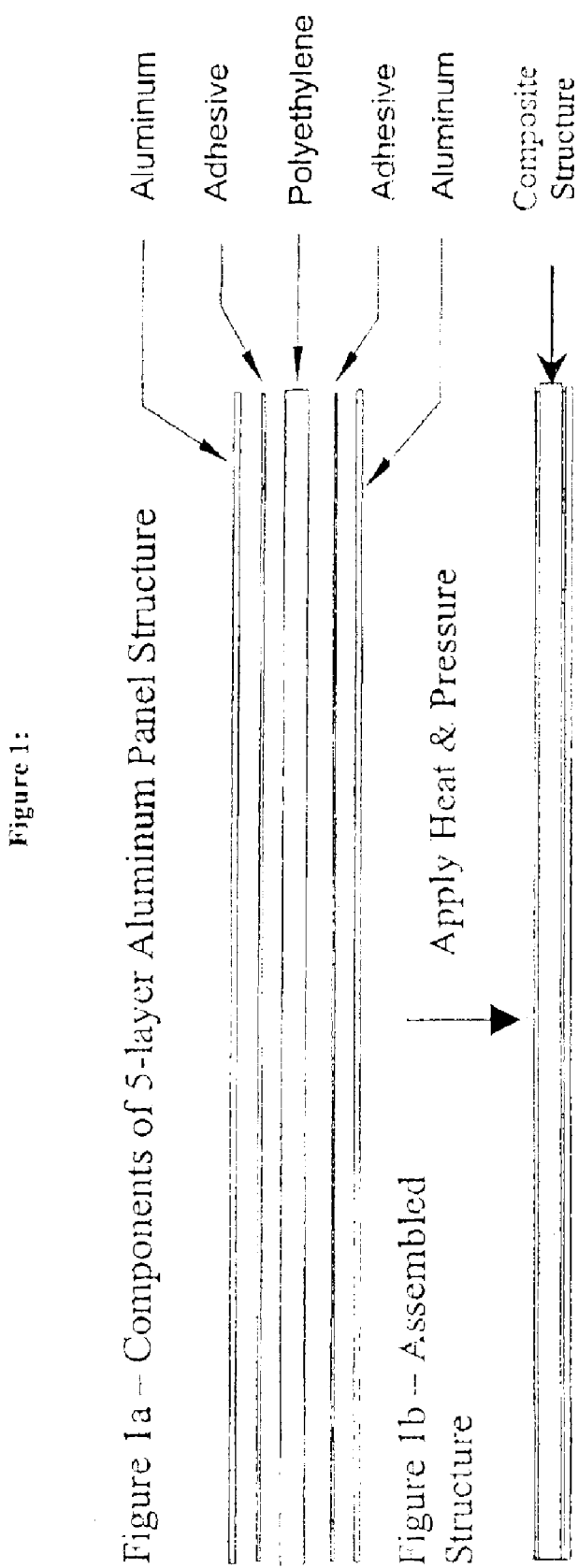

LOW ACTIVATION TEMPERATURE ADHESIVE COMPOSITION WITH HIGH PEEL STRENGTH AND COHESIVE FAILURE

This application claims the benefit of U.S. provisional application No. 60/152,539 filed Sep. 3, 1999.

FIELD OF THE INVENTION

This invention relates to new resin and adhesive compositions, and in particular to low activation temperature adhesive compositions that can be applied as a self-supporting film or can be co-extruded or extrusion coated onto a substrate.

BACKGROUND OF THE INVENTION

While it is known that acid-modified or anhydride-modified polymers are useful as adhesives for bonding to both metal and polyolefins, there is a need to have adhesives with not only high-bond strength to both metal and polyolefins, but also to activate the bonding at relatively lower temperatures. Conventional and currently commercially available modified polyolefins sacrifice either bonding strength to the metal or to the polyolefin, or do not activate at low temperatures when bonding to metals or polyolefins. Furthermore, adhesive compositions that purport to activate at low temperatures are often very soft and tacky materials such that the handling of these compositions as free films in thermal laminating processes is problematic and may require very costly release films to prevent blocking. Also, most current adhesives tend to significantly lose their bond strength over time after they are put into service. This phenomenon is referred to as "age-down" in the industry.

There are number of patents in the art that disclose adhesive compositions but these prior art patents are not satisfactory in every aspect mentioned in this specification. Examples of these prior art patents include U.S. Pat. Nos. 5,516,583; 4,861,676; 4,861,677; 4,552,819; and 5,965,255.

One example of the prior art is U.S. Pat. No. 5,225,482 issued Jul. 6, 1993 to Nakagawa et al, which discloses an adhesive composition comprising an ethylene-vinyl acetate copolymer, a styrene polymer resin, a graft-modified polyethylene, a polystyrene elastomer and an ethylene-α-olefin coploymer. There is no disclosure of the use of high impact polystyrene as the styrene resin in combination with an olefin/non-olefin copolymer.

It has been found that the formulations for the adhesive compositions of the present invention solve many, or all, of these problems. The adhesive compositions of the present invention bond-to both metal and polyolefins, activate at relatively lower temperatures and are easily handled as a free or coextruded film not requiring interleafing or a release paper. In addition, it has been found that these adhesive compositions fail 100% cohesively during the peel test. Cohesive failure is a desirable attribute in that it can be an indicator of high bond strength, so much so that the bond strength is greater than the cohesive strength of the adhesive. Cohesive failure also provides a convenient visual test to assure that multi-layer constructions are properly bonded when other testing methods are not readily available. Finally there appears to be a strong correlation between the cohesive failure mode of the adhesive and the retention of bond strength after the product is put into service.

Accordingly, the present invention provides adhesive compositions that possess excellent bonding properties to metallic substrates and to a number of polymeric materials resulting in an adhesive layer with high peel strength. The present invention also allows for a relatively lower activation temperature to be used in the manufacture of building panels.

The adhesive compositions of the present invention may be supplied as an adhesive resin in pellet form or as an adhesive film.

SUMMARY OF THE INVENTION

Accordingly, in one aspect of the present invention, there is provided a resin composition made from admixing starting materials comprising:

(a) 0 to 90 parts by weight of a polyolefin;

(a) 5 to 95 parts by weight of a functional polyolefin;

(c) 5 to 40 parts by weight of a polystyrenic; and (d) 0 to 30 parts by weight of an elastomer, where the total amount of components of (a), (b), (c) and (d) in the resin composition is 100 parts by weight.

In a second aspect of the present invention, there is provided a resin composition made from admixing starting materials comprising:

(a) 0 to 90 parts by weight of a non-olefin copolyner;

(b) 5 to 95 parts by weight of a functional polyolefin;

(c) 5 to 40 parts by weight of high impact polystyrene; and (e) 0 to 30 parts by weight of an elastomer, where the total amount of components of (a), (b), (c) and (d) in the resin composition is 100 parts by weight.

BRIEF DESCRIPTION OF THE DRAWINGS

The preferred embodiments of the present invention will be described with reference to the accompanying drawings in which like numerals refer to the same parts in the several views and in which:

FIGS. 1a and 1b are schematic views of a five-layer laminated structure made using one embodiment of the adhesive composition of the present invention.

DETAILED DESCRIPTION OF THE PREFERRED EMBODIMENT

The present invention will be described with reference to its preferred embodiments.

The preferred resin and adhesive compositions of the present invention as described herein are melt blends of a number of polymers. These adhesives can be used in various kinds of applications and possess varying properties depending on the specific application. One application for these preferred adhesives is in manufacturing metal panels for the construction industry in which the panels are in the form of a composite structure comprising metal substrates such as aluminum or steel bonded to a polyolefin core such as polyethylene. The preferred adhesive compositions of the present invention are used to bond the metal substrates to the polyethylene core.

In such an application, it is important for the adhesive layer to provide excellent adhesion of the polyolefin to the metal substrate. As well, it is desirable that the adhesive fail cohesively during application, and should be relatively easy to formulate and use. It has been found that the adhesive compositions of the present invention provide excellent adhesion to metallic substrates and to a number of polymeric materials. They fail 100% cohesively during the peel test. The adhesive compositions can be used as self-supporting films, making them easy to handle and process.

The preferred adhesive compositions of the present invention activate at lower temperatures than adhesives currently used in manufacturing building panels. For the preferred adhesive compositions, the activation temperature can be lowered down to about 125° C. This lowering of the activation temperature results in considerable cost savings and safer operations for panel manufacturers because the use of protective layers for painted surfaces (which are needed at higher temperatures to prevent mottling of the paint) can be eliminated from the manufacturing process.

In one aspect, the resin composition of the present invention comprises:

a) 0 to 90 parts by weight of a polyolefin;
b) 5 to 95 parts by weight of a functional polyolefin;
c) 5 to 40 parts by weight of a polystyrenic; and
d) 0 to 30 parts by weight of an elastomer, where the total amount of components of (a), (b), (c) and (d) in the resin composition is 100 parts by weight.

In a second aspect, the resin composition of the present invention comprises:

a) 0 to 90 parts by weight of a non-olefin copolymer;
b) 5 to 95 parts by weight of a functional polyolefin;
c) 5 to 40 parts by weight-of high impact polystyrene; and
e) 0 to 30 parts by weight of an elastomer, where the total amount of components of (a), (b), (c) and (d) in the resin composition is 100 parts by weight.

In this patent specification, the term "polyolefin" means homopolymers and copolymers of olefins. More specifically, homopolymers include polymers consisting of a single unsaturated olefin such as polyethylene, polypropylene, polybutene or the like where the olefin has 2–20 carbon atoms. Copolymers of olefins include polymers consisting of one or more unsaturated or multiply unsaturated hydrocarbons having 2–20 carbon atoms. Examples include, but are not limited to ethylene/propylene copolymers, ethylene/butene copolymers, ethylene/hexene copolymers, ethylene/octene copolymers, ethylene/styrene copolymers, ethylene/butene/octene copolymers, ethylene/propylene/norbomadiene copolymers and propylene/butene copolymers.

In this patent specification, the term "non-olefin copolymer" refers to copolymers of olefins with non-olefins. Non-olefins that can be copolymerized with olefins, principally ethylene, include but are not limited to: vinyl acetate, acrylate or methacrylate esters having 1–20 carbon atoms, unsaturated anhydrides such as maleic or itaconic anhydride, unsaturated acids such as maleic, fumaric, acrylic, methacrylic or itaconic acid. Examples of copolymers of olefins and non-olefins include, but are not limited to: ethylene/vinyl acetate, ethylene/methylacrylate, ethylene/butylacrylate. These polymers can be made by processes well known in the art, including the use of metallocene catalysts, Ziegler Natta catalysts and other catalysts useful in "low pressure" polymerization processes. Conversely, these polymers may be made in "high pressure" polymerization processes using, for example, free radical initiators. Mixtures and blends of the Polyolefins may be used.

In this patent specification, the term "functional polyolefin" refers to a polyolefin or a non-olefin copolymer that has specific functional groups capable of reacting to form covalent or ionic bonds. A functional polyolefin includes a "grafted polyolefin" as defined below.

The term "grafted polyolefin" refers to a polyolefin, to a non-olefin copolymer or to a mixture or blend of polyolefins and/or non-olefin copolymers, onto which is grafted at least one monomer selected from ethylenically unsaturated carboxylic acids and ethylenically unsaturated carboxylic acid anhydrides, including less preferably, derivatives of such acids, and mixtures thereof. Examples of the acids and anhydrides, which may be mono-, di- or polycarboxylic acids are acrylic acid, methacrylic acid, maleic acid, furnaric acid, itaconic acid, crotonic acid, itaconic anhydride, maleic anhydride and substituted maleic anhydride, e.g. dimethyl maleic anhydride or citrotonic anhydride, nadic anhydride, nadic methyl anhydride, and tetrahydrophthalic anhydride, maleic anhydride being particularly preferred. Examples of the derivatives of the unsaturated acids are salts, amides, imides and esters, e.g., mono- and disodium maleate, acrylamide, glycidyl methacrylate and dimethyl fumarate. Grafted polyolefins are well known in the art and can be produced by a variety of processes including thermal grafting in an extruder or other mixing device, grafting in solution or grafting in a fluidized bed reactor. Blends or mixtures of grafted polyolefins may also be used.

In this patent specification, the term "polystyrenic" refers to homopolymers of stryrene or alpha methylstyrene or copolymers of styene with unsaturated monomers such as, but not limited to: ethylene, butene, butadiene, or isoprene. Specific examples include, but are not limited to: ethylene/styrene random or block copolymers, ethylene/butadiene random or block copolymers and hydrogenated and partially hydrogenated butadiene/styrene copolymers. Also useful are polystyrenics further modified for enhanced impact properties and usually referred to as High Impact Polystyrene or HIPS. Blends and mixtures of polystyrenics may also be used. Specifc examples include, but are not limited to, High Performance Stryrenics sold by Nova Chemicals and ethylene/styrene copolymers sold by Dow Chemical under the name Index™.

In this patent specification, the term "elastomer" also refers to a polyolefin or polystyrenic but is dinstinguised from polyolefin, or polystyrenic as described above in having a relatively low level of crystallinity, that is, in being relatively amorphous. Elastomers by definition herein will have a beat a fusion, as measured by Differential Scanning Calorimetry (DSC), at 10 degrees centigrade per minute heating rate, of less than 30 joules/gram. A polyolefin elastomer, for example, may be a copolymer of ethylene and an alpha olefin and would include low density metallocene ethylene/butene copolymers sold by ExxonMobil under the name "Exact®" or metallocene ethylene/octene copolymers sold by DuPont Dow Elastomers under the name "Engage®". It would also include ethylene/propylene copolymers sold by ExxonMobil under the name "Vistalon®", ethylene/alpha olefin copolymer sold by Mitsui under the name "Tafmer®" or ethylene/propylene/norbornadiene copolymers sold by DuPont Dow Elastomers under the name of "Nordel®" It would also include polybutene rubber, polyisobutylene. Examples of a polystyrenic elastomer would include, for example, di-block and tri-block copolymers sold by Shell under the name "Kraton®" or those sold by Firestone under the name "Stereon®".

In addition to the above-mentioned components, the preferred adhesive compositions of the present invention may contain small amounts of other materials commonly used and well known in the adhesive art. These materials include, for example, primary and secondary antioxidants, stabilizers, slip additives, antiblock additives such as silica or talc, dyes, pigments and tackifying resins such as those described in the Kirk Othmer *Encyclopedia of Chemical Technology*, so long as the addition of these additives does not significantly adversely affect the adhesive qualities of the composition.

The adhesive compositions of the present invention can be dry blended and subsequently melt blended in a twin screw extruder and repelletized as is well known in the art. Subsequently, these melt blended resins can be converted and applied by a variety of techniques and processes. For example, the adhesive can be converted into a film by cast or blown film die extrusion techniques and this adhesive film can be laminated to appropriate substrates such as metals or polyolefins. As an alternative, the adhesive composition can be coextruded with other polyolefins as a skin layer on either one or both surfaces of the polyolefin to produce a more economical adhesive film.

As a further alternative, a coextruded film can be created incorporating polar barrier resins such as polyamides, ethylene vinyl alcohol copolymer (EVOH) or polyester using the adhesive compositions of the present invention to bond directly to the polar barrier material. These adhesive films can be laminated to various substrates by heat activating the adhesive film. Heat activation can be done by a variety of methods including, but not limited to, direct contact with a heated plate or roller, absorption of infrared energy, direct heating in an oven or activation through RF frequency or microwave radiation.

In another application for the adhesive compositions of the present invention, the adhesive can be directly coated onto a substrate in processes well known in the art, including, for example, extrusion lamination, extrusion coating, coextrusion lamination and coextrusion coating. The adhesive composition of the present invention can be used to bond to polar barrier resins, such as EVOH, polyamide or polyester. It can also be used to bond to metals, such as steel, aluminum, copper and brass, and to polyolefins such as polyethylene, ethylene copolymers and polypropylene.

In one preferred embodiment of the present invention, a resin composition is provided made from starting materials that comprise the following components:
- (a) 0 to 90 parts by weight, and more preferably 20 to 60 parts by weight, of linear low density polyethylene (for example, commercially available under the name Exact® from ExxonMobil or under the name Sclair® from Nova Chemicals);
- (b) 5 to 95 parts by weight, and more preferably 10 to 30 parts by weight, of maleic anhydride grafted polyethylene (for example, commercially available under the name Fusabond® from DuPont);
- (c) 5 to 40 parts by weight, and more preferably 10 to 35 parts by weight, of high impact polystyrene (for example, commercially available as High Performance Styrenics from Nova Chemicals); and
- (d) 0 to 30 parts by weight, and more preferably 10 to 25 parts by weight, of an ethylene-propylene diene rubber compound (for example, commercially available under the name Nordel IP® from DuPont-Dow Elastomers);
where the total amount of components of (a), (b), (c) and (d) in the resin composition is 100 parts by weight.

In a second embodiment of the present invention, an adhesive composition is provided that comprises the following components:
- (a) 0 to 90 parts by weight, and more preferably 40 to 60 parts by weight, of ethylene vinyl acetate copolymer preferably having 3 to 40 wt % of vinyl acetate, and more preferably, 5 to 30 wt % of vinyl acetate (an example of a suitable commercially available ethylene vinyl acetate copolymer is sold under the name Elvax® by DuPont);
- (b) 5 to 95 parts by weight, and more preferably 10 to 30 parts by weight, of maleic anhydride grafted polyethylene (for example, commercially available under the name Fusabond® from DuPont);
- (c) 5 to 40 parts by weight, and more preferably 10 to 35 parts by weight, of high impact polystyrene (for example, commercially available as High Performance Styrenics from Nova Chemicals); and
- (d) 0 to 30 parts by weight, and more preferably 10 to 25 parts by weight, of an ethylene-propylene diene rubber compound (for example, commercially available under the name Nordel IP® from DuPont-Dow Elastomers); where the total amount of components of (a), (b), (c) and (d) in the resin composition is 100 parts by weight.

In these two preferred embodiments of the present invention, polyisobutylene may be used instead of the ethylene-propylene diene elastomer compound. As well, polystyrenic styrene-butadiene elastomer having different butadiene contents may be used with similar effects.

Each component of the adhesive compositions of the present invention preferably provides certain attributes to the final adhesive. The low melting point polyolefin, such as polyethylene or ethylene vinyl acetate copolymer, enhances the low activation temperature property of the adhesive. The grafted polymer mainly contributes to the superior bonding of the adhesive composition to metal substrates. The elastomer component enhances its resistance to debonding and increases toughness of the final adhesive compositions. Finally, the polystyrenic component provides the superior cohesive failure properties, as well as, surprisingly, higher bonding properties.

The preferred adhesive compositions of the present invention can have melt flow rates between 0.1 to 100 dg/min, more preferably from 0.5 to 50 dg/min and most preferably from 0.8 to 25 dg/min., as measured by ASTM-1238E. The peak melting point, as measured by DSC, can be between 55° C.–140° C. depending on the composition.

Because of their unique combination of high peel strength, low surface tack when processed into films and bonding at low temperature, the preferred adhesives of the present invention are useful in the manufacture of aluminum and steel building panels.

EXAMPLES

The following examples show the surprising advantages of using a polystyrenic such as high impact polystyrene (HIPS) in providing additional peel strength, cohesive mode of failure and a non-tacky adhesive film.

Example 1

Table 1 shows the compositions 1A, 1B and 1C at 0 wt %, 10 wt % and 20 wt % High Impact Polystyrene ("HIPS") respectively. These compositions were dry-blended initially and fed to a small co-rotating twin-screw extruder. The melt-compounded materials were pelletized and then blown into film with an average thickness of about 75 microns. The films were subsequently used as adhesive layers to make a 5 layer composite structure as shown in FIGS. 1a and 1b. The aluminium was aludyne treated and had a thickness of 0.38 mm. The polyethylene core used was low-density polyethylene (LDPE) sheet, 2 mm thick.

The lamination of the structures were carried out in a electrically heated press as follows (FIGS. 1a and 1b):
1—Preheat the 5-layer structure for 4.5 min. @ 100° C.
2—Apply pressure of 5 kgf/cm$^2$ at 135° C. for 20 seconds.
3—Release the pressure and leave the composite in the press for an additional 1.5 min. @ 135° C.
4—Air cool the sample to room temperature.

The composite structure was then tested to measure the peel strength (ASTM 1876) using an Instron™ machine. The following conditions were used during the peel strength test:
i) Crosshead speed: 100 mm/min.
ii) Peel mode: 180°

The last two columns in Table 1 indicate the results of the peel strength and failure mode as the amount of Component d (HIPS) is increased from 0 wt % to 20 wt %. Comparing composition 1A with compositions 1B and 1C, the surprising effect of peel strength enhancement due to the presence of the polystyrenic HIPS component can be seen. It is also highly desirable to achieve a cohesive failure (50/50 to polyethylene and aluminum respectively). Sample 1C shows 80% cohesive failure as compared to adhesive failure in the other two compositions.

TABLE 1

MonoLayer Ethylene Vinyl Acetate (EVA) based Adhesives

| ID No. | Comp. (a) Wt % | Comp. (b) Wt % | Comp. (c) Wt % | Comp. (d) Wt % | Comp. (e) Wt % | Peel Strength kgf/25 mm | Failure Mode |
|---|---|---|---|---|---|---|---|
| 1A | 49.9 | 30.0 | 20.0 | 0.0% | 0.1 | 16.4 | Adhesive to Aluminum |
| 1B | 39.9 | 30.0 | 20.0 | 10.0 | 0.1 | 23.6 | Adhesive to Aluminum |
| 1C | 29.9 | 30.0 | 20.0 | 20.0 | 0.1 | 29.8 | 80% Cohesive |

Component (a) = Ethylene vinyl acetate (EVA) copolymer with 12% VA content and MI of 2.5 dg/min.
Component (b) = Linear low-density polyethylene (LLDPE) grafted with maleic anhydride at 0.9 wt % and MI of 2.5 dg/min.
Component (c) = Ethylene/propylene/norbornadiene copolymers (EPDM) Elastomers with Moony Viscosity of 20.
Component (d) = Polybutadiene impact modified polystyrene (HIPS) Elastomers
Component (e) = Hindered polyphenol antioxidant stabilizer

Example 2

Samples were prepared as described in Example 1 with the exception that co-extruded blown films of polyethylene/Adhesive were made and substituted for a pure adhesive film in order to reduce the cost of the adhesive used. The compositions 2A, 2B and 2C are co-extruded with a linear low density polyethylene (LLDPE) producing LLDPE-Adhesive (each layer being 25 micron thick). The results are summarized in Table 2. The co-extruded films generally result in lower peel strength as can be seen comparing 1C vs. 2A (29.8 vs. 16.5 kgf/25 mm, respectively) but they are still functional. The addition of high impact polystyrene at 30 wt % level (2C) appears to lower the peel strength. This latter composition is still functional though not optimal.

2-step process, in order to more closely simulate an actual commercial production. Adhesives of 3D and 3E were initially laminated to aluminium at a temperature of 149° C., using a pressure of 8.5 kgf/cm² for 30 seconds. These pre-laminated aluminium sheets were then pressed with a pre-heated LDPE core at 132° C., using a pressure of 8.5 kgf/cm² for 10 seconds. The peel testing was performed at a 90° angle as opposed to the 180° angle used in the other examples. Composition 3D is a repeat of 3C and is used to compare the performance between the different lamination and testing methods. Sample 3D represents much lower peel strength than 3C due to 180° peel test vs. a 90° peel for sample 3C.

Once again increasing the amount of impact modified polystyrene (HIPS) from 0 wt % –20 wt % (comparing

TABLE 2

2-Layer Ethylene Vinyl Acetate (EVA)/Polyethylene based Adhesives

| ID No. | Comp. (a) Wt % | Comp. (b) Wt % | Comp. (c) Wt % | Comp. (d) Wt % | Comp. (e) Wt % | Reel Strength kgf/25 mm | Failure Mode |
|---|---|---|---|---|---|---|---|
| 2A | 29.9 | 30.0 | 20.0 | 20.0 | 0.1 | 16.5 | 100% Cohesive |
| 2B | 44.9 | 20.0 | 15.0 | 20.0 | 0 1 | 17.5 | 100% Cohesive |
| 2C | 34.9 | 20.0 | 15.0 | 30.0 | 0.1 | 10.9 | 100% Cohesive |

Component (a) = Metallocene ethylene butene copolymer with 0.905 density and MI of 4.5 dg/min.
Component (b) = High-density polyethylene (HDPE) grafted with maleic anhydride at 1.0 wt % and MI of 11 dg/min.
Component (c) = Ethylene/propylene/norbornadiene copolymers (EPDM) Elastomers with Moony Viscosity of 20.
Component (d) = Polybutadiene impact modified polystyrene (HIPS) Elastomers
Component (e) = Hindered polyphenol antioxidant stabilizer

Example 3

In this example, compositions were made using metallocene linear low-density polyethylene as the base resin. Table 3 summarises the compositions. Samples 3A, 3B and 3C were prepared as those described in Examples 1 and 2. The last two compositions 3D and 3E were prepared in a samples 3A to 3C) resulted in significant increase in peel strength. The mode of failure also improved and become more cohesive. Sample 3E, containing 30% HIPS, shows a high peel strength value (20.5 kgf/25 mm in 90° peel mode) and 00% cohesive failure. It should be noted that products currently used in commercial production totally fail when using this "low lamination temperatures" of about 132° C.

TABLE 3

Metallocene LLDPE based Adhesives:

| ID No. | Comp. (a) Wt % | Comp. (b) Wt % | Comp. (c) Wt % | Comp. (d) Wt % | Comp. (e) Wt % | Reel Strength kgf/25 mm | Failure Mode |
|---|---|---|---|---|---|---|---|
| 3A | 59.9 | 20.0 | 20.0 | 0.0 | 0.10 | N/A | Adhesive To Aluminum |
| 3B | 49.9 | 20.0 | 20.0 | 10.0 | 0.10 | 26.9 | Adhesive To Aluminum |
| 3C | 39.9 | 20.0 | 20.0 | 20.0 | 0.10 | 36.3 | 20% Cohesive |
| 3D | 39.9 | 20.0 | 20.0 | 20.0 | 0.10 | 18.8 | 30% Cohesive |
| 3E | 29.9 | 20.0 | 20.0 | 30.0 | 0.10 | 20.5 | 100% Cohesive |

Component (a) = Metallocene ethylene butene copolymer with 0.905 density and MI of 4.5 dg/min.
Component (b) = High-density polyethylene (HDPE) grafted with maleic anhydride at 1.0 wt % and MI of 11 dg/min.
Component (c) = Ethylene/propylene/norbornadiene copolymers (EPDM) Elastomers with Moony Viscosity of 20.
Component (d) = Polybutadiene impact modified polystyrene (HIPS) Elastomers
Component (e) = Hindered polyphenol antioxidant stabilizer present invention has been shown and described with respect to its preferred embodiments, it will be understood by those skilled in the art that other changes, modifications, additions and omissions may be made without departing from and the scope of the present invention as defined by the attached claims.

What is claimed is:

1. A composition made from admixing starting materials consisting essentially of:
   (a) 20 to 60 parts by weight of polyethylene;
   (b) 10 to 30 parts by weight of maleic anhydride grafted polyethylene;
   (c) 10 to 35 parts by weight of a high impact polystyrene; and
   (d) 10 to 25 parts by weight of an ethylene-propylene diene rubber compound,
   where the total amount of components of (a), (b), (c) and (d) in the resin composition is 100 parts by weight.

2. The resin composition of claim 1 wherein the polyethylene comprises one or more of high density polyethylene, linear low density polyethylene and low density polyethylene.

3. The resin composition of claim 1 wherein the grafted polyethylene is selected from the group consisting of maleic anhydride grafted linear low density polyethylene, maleic anhydride low density polyethylene, and maleic anhydride grafted high density polyethylene.

4. An adhesive composition comprising the resin of claim 1.

5. The adhesive composition of claim 4 further comprising minor amounts of additives selected from the group consisting of primary and secondary antioxidants, stabilizers, slip additives, antiblock additives, dyes, pigments and tackifying resins, so long as the addition of these additives does not significantly adversely affect the adhesive qualities of the adhesive composition.

6. A composite structure comprising:
   (a) a metal substrate;
   (b) a polymeric layer; and
   (c) a layer of the adhesive composition of claim 4 between the metal substrate and the polymeric layer.

7. A resin composition made from admixing starting materials consisting essentially of:
   (a) 40 to 60 parts by weight of ethylene vinyl acetate copolymer;
   (b) 10 to 30 parts by weight of maleic anhydride grafted polyethylene;
   (c) 10 to 35 parts by weight of high impact polystyrene; and
   (d) 10 to 25 parts by weight of an ethylene-propylene diene rubber compound,
   where the total amount of components of (a), (b), (c) and (d) in the resin composition is 100 parts by weight.

8. The resin composition of claim 7 wherein the ethylene vinyl acetate copolymer contains 3 to 40 wt % vinyl acetate.

9. The resin composition of claim 8 wherein the ethylene vinyl acetate copolymer contains 5 to 30 wt % vinyl acetate.

10. An adhesive composition comprising the resin of claim 7.

11. The adhesive composition of claim 10 further comprising minor amounts of additives selected from the group consisting of primary and secondary antioxidants, stabilizers, slip additives, antiblock additives, dyes, pigments and tackling resins, so long as the addition of these additives does not significantly adversely affect the adhesive qualities of the adhesive composition.

12. A composite structure comprising:
   (a) a metal substrate;
   (b) a polymeric layer; and
   (c) a layer of the adhesive composition of claim 10 between the metal substrate and the polymeric layer.

* * * * *